Figure 1:
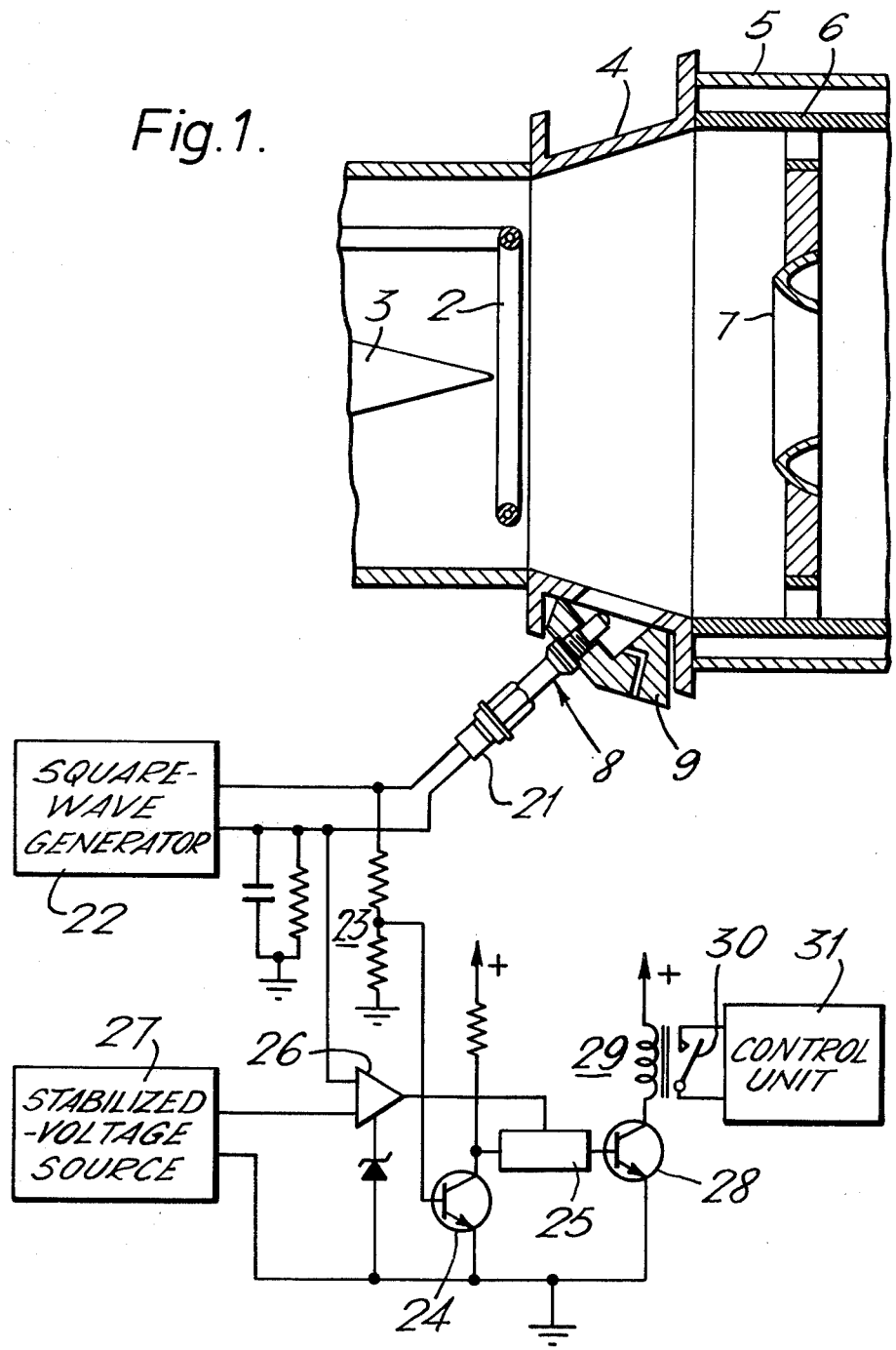

United States Patent [19]

Baker et al.

[11] 4,029,966
[45] June 14, 1977

[54] RADIATION-DETECTING DEVICES AND APPARATUS

[75] Inventors: Peter D. Baker; Denys V. Hollands, both of Basingstoke, England

[73] Assignee: Smiths Industries Limited, London, England

[22] Filed: May 21, 1975

[21] Appl. No.: 579,651

[30] Foreign Application Priority Data

May 21, 1974 United Kingdom ............ 22551/74

[52] U.S. Cl. .............................. 250/372; 250/510
[51] Int. Cl.² .......................................... G01J 1/42
[58] Field of Search .......... 250/505, 510, 372, 503, 250/504, 414, 322

[56] References Cited

UNITED STATES PATENTS

| | | | |
|---|---|---|---|
| 2,082,934 | 6/1937 | Anderson et al. | 250/372 |
| 3,185,846 | 5/1965 | Gilbert | 250/372 |
| 3,445,662 | 5/1969 | Langley | 250/504 |
| 3,665,440 | 5/1972 | McMenamin | 250/372 |
| 3,767,955 | 10/1973 | Johnson | 250/372 |
| 3,790,800 | 2/1974 | Linner | 250/372 |
| 3,793,552 | 2/1974 | Glascock et al. | 250/372 |
| 3,891,849 | 6/1975 | Felice et al. | 250/372 |
| 3,917,948 | 11/1975 | Strutz | 250/372 |

*Primary Examiner*—Alfred E. Smith
*Assistant Examiner*—B. C. Anderson

*Attorney, Agent, or Firm*—Pollock, Vande Sande & Priddy

[57] ABSTRACT

A radiation-detecting device which is mounted on a gas-turbine engine to receive radiations from the afterburner combustion-zone, includes a gas-filled electrical discharge tube that is located within a tubular nose of the device and is pulse energized. The ultra-violet component of radiations from the zone and distinctive of the presence of flame in the afterburner, is transmitted to the discharge tube via a sapphire plano-convex lens, the infra-red component being attenuated by a thin gold-film coating on the planar face of the lens, whereby discharge takes place in the tube with each energizing pulse only while the flame is present. The sensitivity of the detecting device to ultra-violet radiation is enhanced by internal reflections from reflective coatings on the inner surface of the tubular nose and the glass envelope of the discharge tube. The count of a counter is advanced stepwise with each pulsing of the discharge tube towards a maximum count of 8 (or 16), and is reset to zero in response to each tube discharge so that the counter overflows only after the tube remains quiescent through more than 8 (or 16) consecutive pulsings. Overflow of the counter signifies positively the flame-out condition and initiates warning and relighting action by a control unit.

14 Claims, 2 Drawing Figures

U.S. Patent June 14, 1977 Sheet 1 of 2 4,029,966

RADIATION-DETECTING DEVICES AND APPARATUS

This invention relates to radiation-detecting devices and to apparatus including such devices.

Radiation-detecting devices have been proposed for monitoring combustion within a gas-turbine engine, and more especially for monitoring continuation of the flame in the engine. Such devices have in particular been proposed for use in gas-turbine engines of aircraft where it is necessary to provide warning or other response to the condition in which the flame becomes extinguished, in order that the engine can be relighted and power thereby restored, without undue delay.

A problem experienced with radiation-detecting devices used in the context of engine-flame monitoring is that the response of the sensor tends in general to be degraded by the heat radiation received from the engine. Furthermore, there is the problem that the device is required to be largely unresponsive to radiation from incandescent parts of the engine so that it shall provide prompt response to the condition in which the flame becomes extinguished. It has been recognized that these problems could be reduced to a significant extent by filtering out the infra-red component from the radiation received by the sensor. However normal infra-red filters that will enable ultra-violet radiation to pass to the sensor have not been found satisfactory for the high-temperature environment of engine operation. It is one of the objects of the present invention to provide a radiation-detecting device including a filter that is suitable for such environment.

According to this aspect of the present invention there is provided a radiation-detecting device in which a sensor receives radiation via a filter which is provided by a thin film of gold that attenuates the infra-red component to a larger extent than the ultra-violet component of the radiations passed to the sensor.

The thickness of the film of gold will in general lie within the range of 10 Angstrom units to 200 Angstrom units. The thicker the film the greater is the attenuation of the infra-red component, but the ultra-violet component is affected similarly, and so choice of film thickness depends on a compromise between the desired sensitivity of the detecting device and the magnitude of infra-red radiation that can be tolerated.

The gold-film filter may be carried by a sapphire window. The window may be planar, but may alternatively be provided in the form of a lens.

The present invention also relates to radiation-detecting apparatus in which the response of a radiation-detecting device is interrogated repeatedly to determine whether a level of radiation corresponding to a predetermined condition is detected thereby. Such apparatus may be utilized in the above-indicated context of monitoring combustion in a gas-turbine engine, the response of the detecting device being interrogated repeatedly to enable warning to be given, or remedial action to be taken, promptly whenever the flame becomes extinguished. However, it has been found that with such apparatus there is normally the problem that very short interruptions in the flame or in the response of the detecting device may occur normally in practice, and that such interruptions tend to give rise to warning or initiation of the remedial action, unnecessarily. It is an object of the invention to provide radiation-detecting apparatus that may be used to avoid, or at least reduce, such nuisance operations.

In accordance with this latter aspect of the present invention there is provided radiation-detecting apparatus in which response of a radiation-detecting device is interrogated repeatedly to determine whether a level of radiation corresponding to a predetermined condition is detected thereby, and a warning or other device is operated in the event that the said condition no longer exists, the apparatus including a counter that is arranged to operate a warning or other device when a predetermined value of count (for example, the maximum count-value) of the counter is exceeded. The count of the counter is advanced towards this latter value with each successive interrogation of the detecting device, but is reset to its initial, starting count (for example, zero) whenever the existence of the said predetermined condition is signified by the response of the detecting device during interrogation.

Thus with the radiation-detecting apparatus of this aspect of the invention, operation of the warning or other device will occur only after the response of the detecting device has signified absence of the condition throughout a predetermined number of successive interrogations. By suitable choice of this number it is readily possible to avoid nuisance operations while still preserving the rapid and positive operation otherwise required.

The predetermined condition detected may be the absence of radiation so that the warning or other device is to be operated when radiation is detected. But on the other hand, and in the context of flame-detection referred to above, the said condition may be the presence of flame in the appropriate combustion zone.

Figure 2:
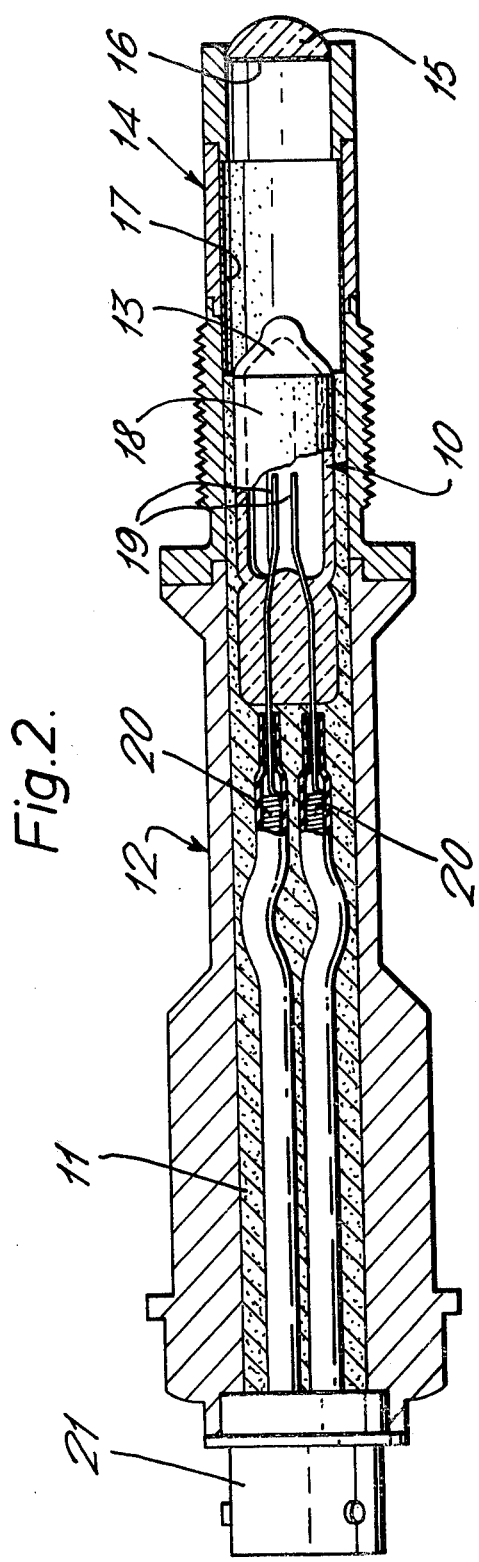

A radiation-detecting device and apparatus including such device, in accordance with the present invention and for use in flame-detection or -monitoring in a gas-turbine engine of an aircraft, will now be described by way of example, with reference to the accompanying drawings in which:

FIG. 1 shows the flame-monitoring apparatus including the radiation-detecting device as mounted on the gas-turbine engine; and FIG. 2 is a longitudinal section of the radiation-detecting device.

Although the flame-monitoring apparatus to be described may be used to detect the condition in which the flame in the main combustion zone of the gas-turbine engine is extinguished, it may alternatively be used to provide the same facility in respect of the afterburner of the engine. It is in this latter context that the apparatus is illustrated in the drawings and will now be described.

Referring to FIG. 1, the afterburner, which is mounted between the turbine and the propelling nozzle of the engine, has a casing 1 that surrounds a fuel-supply ring 2 (there may be more than one of these) and the exhaust cone 3 of the engine. The casing 1 is connected by a ring-girder 4 to the tail-pipe 5 and to the flame-tube 6 of the afterburner.

The afterburner is brought into operation when increased thrust is required, by pumping fuel through the supply ring 2. A flame-holder 7 which is located downstream of the ring 2, creates turbulence to ensure good mixing of the fuel with the hot exhaust gases that flow normally over the cone 3 from the combustion chamber of the engine. Combustion of the mixture envelopes the holder 7 with flame and it is the existence of this flame that is in this case to be monitored. The monitoring is performed using a detector 8 which is screwed into a mounting block 9 on the girder 4 and which is directed to view the flame-holder 7 so as to receive radiation from the combustion zone of the afterburner.

In order that the detector 8 shall respond promptly and positively to the condition in which the afterburner flame becomes extinguished, it is necessary that it discriminate against radiation from any incandescent metal parts of the engine, and shall not be affected by any solar radiation that may enter through the tail-pipe 5. For fulfilment of these requirements the detector 8 is designed to be especially responsive to the ultra-violet component of the radiation it receives, and to be so directed that the flame-tube 6 and -holder 7 block the path of solar radiation to it through the tail-pipe 5. Details of construction of the detector device are shown in FIG. 2.

Referring to FIG. 2, the radiation sensor of the detector 8 is a gas-filled electrical-discharge tube 10 that is resiliently mounted in silicone rubber 11 within a stainless-steel shell 12 of the device. Radiation is received by the tube 10 through the top of its glass envelope 13 from within a tubular nose 14 of titanium that is brazed to the shell 12. A plano-convex lens-window 15 of sapphire is brazed into the far end of the nose 14 to seal the device hermetically and thereby protect the tube 10 from the exhaust gases and other combustion products of the engine.

The sapphire lens-window 15 is capable of withstanding the high temperature of the afterburner combustion zone and is to a substantial degree transparent to ultra-violet radiation. Infra-red radiation received is, however, filtered out by a gold film 16 that coats the rear, plane face of the window 15. The film 16, which has a thickness of approximately 100 Angstrom units, attenuates the transmitted ultra-violet radiation to a small extent, but is highly reflective to infra-red radiation, so that it is mainly the ultra-violet component of the received radiation that is transmitted to the tube 10.

The provision of the filter for attenuating the infra-red radiation transmitted to the tube 10, materially reduces the radiant heating experienced by the tube 10 from the flame. The tube 10 has a maximum operating temperature of some 300° C. and the filtering enables the tube 10 to be located closer to the afterburner combustion-zone thereby enlarging the field of view of that zone, than otherwise could be the case within this limiting temperature. The field of view is further enlarged in the present case, by the provision of the window 15 as a plano-convex lens; the window 15 may otherwise be planar.

The sensitivity of the detector 8 to the radiation transmitted by the gold-coated window 15 from the afterburner combustion-zone, is enhanced by the provision of a reflective coating 17 on the inside surface of the tubular nose 14 so as to ensure that as much as possible of this radiation enters the domed top of the glass envelope 13. More especially, a reflective coating 18, which like the coating 17 is of silver or aluminium and has a thickness of 10,000 Angstrom units, is provided on the outside of the envelope 13 except at the domed top. The coating 18 ensures that ultra-violet radiation entering the tube 10 at any angle is directed, if only after multiple reflection within the envelope 13, into the discharge gap between the two electrodes 19 of the tube 10.

The electrodes 19 extend out through the envelope 13 of the tube 10 and are brazed to respective leads 20 that are coiled, and sheathed with rubber, to withstand vibrational and shock forces. External electrical connection to the leads 20 for energization of the electrodes 19, is established via a bayonet connector 21 that is welded to the shell 12 of the detector device. As indicated in FIG. 1, energization of the electrodes 19 is effected from a square-wave generator 22 (of frequency 400Hz) that is coupled to the connector 21.

The voltage amplitude of the square-wave applied between the electrodes 19 of the tube 10 by the generator 22 is insufficient by itself to initiate discharge. Discharge occurs during an applied pulse of the waveform only if the ultra-violet radiation received within the tube 10 is sufficient to produce a certain minimum degree of preliminary ionisation of the gas between the electrodes 19. This degree of ionisation is produced only if the flame is present at the flame-holder 7.

Pulses in synchronism with the energization-voltage pulses supplied between the electrodes 19 by the generator 22, are supplied from a potentiometer 23 via a transistor 24 to a counter 25. The counter 25 counts these pulses but is reset to zero count whenever there is discharge in the tube 10. In this respect an operational amplifier 26 compares the potential of one of the electrodes 19 of the tube 10 with a potential established by a stabilized-voltage source 27, so that the change in electrode potential resulting from discharge generates a reset pulse for application to the counter 25. This change in potential results from the flow of discharge current and reduces the voltage between the electrodes 19 to below that required to sustain the discharge. Thus whenever there is flame at the flame-holder 7 providing ultra-violet radiation adequate to establish the minimum degree of preliminary ionisation within the tube 10, discharge takes place between the electrodes 19, but only transitorily, with each successive pulse applied from the generator 22. The counter 25 is accordingly repeatedly reset to zero-count with each pulse applied via the transistor 24.

In the event that the flame becomes extinguished, or discharge within the tube 10 is otherwise interrupted, no resetting of the counter 25 takes place, and its count is advanced with each successive pulse from the generator 22. If the interruption is transitory and of very short duration so that discharge within the tube 10 occurs again before the maximum count (for example, eight) of the counter 25 has been exceeded then the resultant pulse supplied from the amplifier 26 resets the counter 25 to zero once more. But if the count is exceeded, overflow of the counter 25 triggers conduction of a transistor 28 to operate a relay 29. Contacts 30 of the relay 29 are as a result closed to signal the fact that the flame has become extinguished to a control unit 31. The unit 31 may simply give warning of the signalled condition to the pilot of the aircraft, but may alternatively, or in addition, initiate automatic action for example to relight the afterburner.

The fact that the relay 29 is energized only if the tube 10 fails to discharge in response to a number of successive cycles of the energizing waveform, is of advantage in avoiding nuisance operation of the control unit 31. Although the number involved referred to above is eight, it may be found desirable and entirely acceptable, in increase this to, say, 16.

A solid state sensor may be used instead of the gas-filled tube 10, and in this case a tubular guideway may be used to direct the ultra-violet radiation onto the sensitive area of the detector. A glass tube provided with an ultra-violet reflective, coating on its outer surface, or a metal tube with a reflective coating on its inner surface, may be used for the guideway. Another possibility for the guideway is the use of a solid rod of ultra-violet transmissive material (for example sapphire) provided with a reflective coating on its outer surface.

We claim:

1. In a radiation-detecting device capable of operation in an adverse temperature environment for detecting the ultra-violet component of radiations received by said device, in which said received radiations are transmitted to a radiation sensor via a filter for filtering out the infra-red component of said received radiations, the improvement wherein the filter is provided by a film of gold, said film having a thickness within the range of 10 Angstrom units to 200 Angstrom units to attenuate the infra-red component to a larger extent than the ultra-violet component of the said received radiations.

2. A radiation-detecting device according to claim 1 wherein the thickness of the film is substantially 100 Angstrom units.

3. A radiation-detecting device according to claim 1 including a window of sapphire and wherein said film is provided as a coating on said window.

4. A device according to claim 3 wherein said window is a lens.

5. A radiation-detecting device capable of operation in an adverse temperature environment, comprising a tubular guideway to provide a path for transmission therealong of ultra-violet radiations, a window mounted at one end of the guideway to transmit radiations received thereby into said guideway, a sensor mounted with said guideway to respond to radiation transmitted along said guideway from said window, and a thin film of gold carried by said window to filter out infra-red radiation from said radiations received by said window, said film having a thickness within the range of 10 Angstrom units to 200 Angstrom units to provide substantial attenuation of the infra-red component of the said radiations transmitted into said guideway.

6. A radiation-detecting device according to claim 5 wherein said window is of sapphire.

7. A radiation-detecting device according to claim 6 wherein said window is in the form of a lens.

8. A radiation-detecting device according to claim 5 wherein said guideway has a wall that is at least in part reflective to radiation transmitted along said guideway by said window.

9. A radiation-detecting device according to claim 5 wherein said sensor is a gas-filled electrical-discharge tube having a glass envelope, and wherein a reflective coating is provided on part of said envelope to enhance reflection of radiation internally of said envelope.

10. Apparatus for detecting radiation having a predetermined characteristic comprising, means for sensing radiation received thereby which has said predetermined characteristic, means for interrogating said sensing means repeatedly to determine at each interrogation whether in accordance with the response of said sensing means a predetermined condition exists, said predetermined condition being related to the level of said radiation received by said sensing means and said interrogating means including signal means to generate a predetermined signal whenever the said predetermined condition is determined to exist at any said interrogation of said sensing means, resettable counting means, means coupled to said counting means to provide a predetermined response when the count of said counting means exceeds a predetermined value, means for advancing the count of said counting means stepwise towards said value upon each successive interrogation of said sensing means, and means responsive to generation of said predetermined signal by said signal means to reset (for resetting) the said counting means (whenever during the successive interrogations of said sensing means said predetermined condition is determined to exist).

11. Radiation-detecting apparatus according to claim 10 wherein the sensing means is electrical means to exhibit a change in impedence in response to received radiation, and wherein said means for interrogating said sensing means includes circuit means for applying electric pulses to said electrical means and means for applying a pulse to reset the said counting means in dependence upon the magnitude of current which flows in said circuit means.

12. Flame-monitoring apparatus comprising means for sensing ultra-violent radiation, a filter mounted in front of said sensing means to limit substantially passage of infra-red radiation to said sensing means, means for interrogating said sensing means repeatedly to determine at each interrogation whether in accordance with the response of said sensing means a predetermined flame-condition exists, said flame-condition being related to the level of ultra-violent radiation received by said sensing means and said interrogating means including signal means to generate a predetermined signal whenever the said flame-condition is determined to exist at any said interrogation of said sensing means, resettable counting means, means coupled to said counting means to provide a predetermined response when the count of said counting means exceeds a predetermined value, means for advancing the count of said counting means stepwise towards said value upon each successive interrogation of said sensing means, and means coupled to said signal means to reset (for resetting) the said counting means in response to generation of said predetermined signal (whenever) during (the successive) interrogation of said sensing means (said predetermined flame-condition is determined to exist).

13. Flame-monitoring apparatus according to claim 12 wherein said filter is a film of gold.

14. Flame-monitoring apparatus according to claim 13 including a sapphire window mounted in front of said sensing means and wherein said gold film is carried by said window.

* * * * *